United States Patent
Kappla et al.

(10) Patent No.: US 11,290,909 B2
(45) Date of Patent: Mar. 29, 2022

(54) SEAMLESS DATA TRAFFIC SWITCHOVER FOR INTERNET OF THINGS DEVICES

(71) Applicant: Microsoft Technology Licensing, LLC, Redmond, WA (US)

(72) Inventors: Srinivas Kappla, Nashua, NH (US); Prasasth Reddy Palnati, Westford, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 16/998,871

(22) Filed: Aug. 20, 2020

(65) Prior Publication Data
US 2022/0060926 A1 Feb. 24, 2022

(51) Int. Cl.
*H04W 28/02* (2009.01)
*H04W 76/10* (2018.01)
*H04W 88/16* (2009.01)

(52) U.S. Cl.
CPC ....... *H04W 28/0252* (2013.01); *H04W 76/10* (2018.02); *H04W 88/16* (2013.01)

(58) Field of Classification Search
CPC .............. H04W 8/08; H04W 28/0252; H04W 28/0983; H04W 36/0022; H04W 36/14; H04W 36/165; H04W 36/18; H04W 36/24; H04W 76/10; H04W 88/16; H04W 92/04; H04W 92/045; H04W 92/10; H04W 92/12
See application file for complete search history.

(56) References Cited

U.S. PATENT DOCUMENTS

| | | | |
|---|---|---|---|
| 11,096,231 B1 * | 8/2021 | Sung ................. | H04W 76/30 |
| 11,147,109 B2 * | 10/2021 | Kim .................. | H04W 24/02 |
| 2019/0021130 A1 * | 1/2019 | Kim .................. | H04W 76/20 |
| 2019/0110235 A1 | 4/2019 | Ying et al. | |
| 2020/0053805 A1 | 2/2020 | Kim | |

OTHER PUBLICATIONS

"International Search Report and Written Opinion Issued in PCT Application No. PCT/US21/039733", dated Oct. 29, 2021, 15 Pages.

* cited by examiner

*Primary Examiner* — Kan Yuen
(74) *Attorney, Agent, or Firm* — Ray Quinney & Nebeker P.C; James Bullough

(57) ABSTRACT

The present disclosure relates to devices and methods for using Cellular Internet of Things (CIoT) to connect Internet of Things (IoT) devices to the internet. The devices and methods may dynamically switch from using communication interfaces associated with Narrow Band IoT (NB-IoT) to communication interfaces that support greater amounts of bandwidth in response to detecting an increase in data traffic. The devices and methods may dynamically establish communication interfaces for transmitting data packets in response to determining that a data transfer rate for the data packets exceeds a threshold. The devices and methods may switch to the newly established communication interface for sending the data packets.

20 Claims, 6 Drawing Sheets

SEAMLESS DATA TRAFFIC SWITCHOVER FOR INTERNET OF THINGS DEVICES

CROSS-REFERENCE TO RELATED APPLICATIONS

N/A

BACKGROUND

Cellular Internet of Things (CIoT) may connect Internet of Things (IoT) devices to the internet using cellular technology. CIoT may use the standards defined in The $3^{rd}$ Generation Partnership Project ("3 GPP") and existing cellular infrastructure to provide secure communications with a plurality of IoT devices.

SUMMARY

In accordance with one aspect of the present disclosure, a method is disclosed that includes receiving, from an application server, downlink data packets to send to at least one Internet of Things (IoT) device using a low bandwidth S11-U interface of a cellular narrow band IoT system. The method also includes determining that a data transfer rate for the downlink data packets exceeds a threshold. The method also includes triggering, by signaling between a Serving Gateway (SGW) and an Evolved Node B of the cellular narrow band IoT system, an establishment of a S1-U interface that has higher bandwidth for transmitting the downlink data packets than the low bandwidth of the S11-U interface. The method also includes switching to the S1-U interface for sending the downlink data packets. The method also includes sending the downlink data packets to the at least one IoT device using the S1-U interface.

The method may further include buffering the downlink data packets while the S1-U interface is being established and sending buffered data packets to the at least one IoT device using the S1-U interface in response to a completion of setting up the S1-U interface.

The method may further include deactivating the S1-U interface in response to a completion of a data transmission event associated with the downlink data packets and resuming use of the S11-U interface for sending new downlink data packets received from the application server for the at least one IoT device.

The data transfer rate may be a number of bytes received per second or a sustained duration of consecutive seconds with data sent to the at least one IoT device.

The threshold may be a limit on the number of bytes received over a period of time.

The method may further include monitoring, by the SGW, the data transfer rate. The SGW may trigger the establishment of the S1-U interface.

The method may further include monitoring, by a Mobility Management Entity (MME), the data transfer rate. The MME may trigger the establishment of the S1-U interface.

The at least one IoT device may be a low power device that uses low bandwidth to send or receive infrequent communications.

In accordance with another aspect of the present disclosure, a computer device is disclosed that includes a memory to store data and instructions. The computer device also includes at least one processor operable to communicate with the memory. The at least one processor is operable to receive, from an application server, downlink data packets to send to at least one Internet of Things (IoT) device using a low bandwidth S11-U interface of a cellular narrow band IoT system. The at least one processor is also operable to determine that a data transfer rate for the downlink data packets exceeds a threshold. The at least one processor is also operable to trigger, by signaling between a Serving Gateway (SGW) and an Evolved Node B of the cellular narrow band IoT system, an establishment of an S1-U interface that has higher bandwidth for transmitting the downlink data packets than the low bandwidth of the S11-U interface. The at least one processor is also operable to switch to the S1-U interface for sending the downlink data packets. The at least one processor is also operable to send the downlink data packets to the at least one IoT device using the S1-U interface.

The processor may be further operable to buffer the downlink data packets while the S1-U interface is being established and send buffered data packets to the at least one IoT device using the S1-U interface in response to a completion of setting up the S1-U interface.

The processor may be further operable to deactivate the S1-U interface in response to completion of a data transmission event associated with the downlink data packets and resume use of the S11-U interface for sending new downlink data packets received from the application server for the at least one IoT device.

The data transfer rate may be a number of bytes received per second or a sustained duration of consecutive seconds with data sent to the at least one IoT device.

The threshold may be a limit on the number of bytes received over a period of time.

The computer device may be the Serving Gateway (SGW).

The computer device may be a Mobility Management Entity (MME).

The at least one IoT device may be a low power device that uses low bandwidth to send or receive infrequent communications.

In accordance with another aspect of the present disclosure, a method is disclosed that includes receiving, on a T6a interface, downlink data packets from an application server to send to a plurality of Internet of Things (IoT) devices using a low bandwidth S1-Mobility Management Entity (MME) interface of a cellular narrow band IoT system. The method also includes determining that a data transfer rate for the downlink data packets exceeds a threshold. The method also includes triggering, by signaling between a Serving Gateway (SGW) and an Evolved Node B of the cellular narrow band IoT system, an establishment of an S1-U interface that has higher bandwidth for transmitting the downlink data packets than the low bandwidth of the S1-MME interface. The method also includes switching to the S1-U interface for sending the downlink data packets. The method also includes sending the downlink data packets to the plurality of IoT devices using the S1-U interface.

The method may also include identifying a subset of the plurality of IoT devices, sending a portion of the downlink data packets associated with the subset of the plurality of IoT devices using the S1-U interface. The method may also include sending the remaining downlink data packets for the plurality of IoT devices using the S1-MME interface.

The threshold may be a limit on the data transfer rate for the plurality of IoT devices over a period of time or a sustained duration of consecutive seconds with data sent to the plurality of IoT device.

The plurality of IoT devices may be low power devices that use low bandwidth to send or receive infrequent communications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
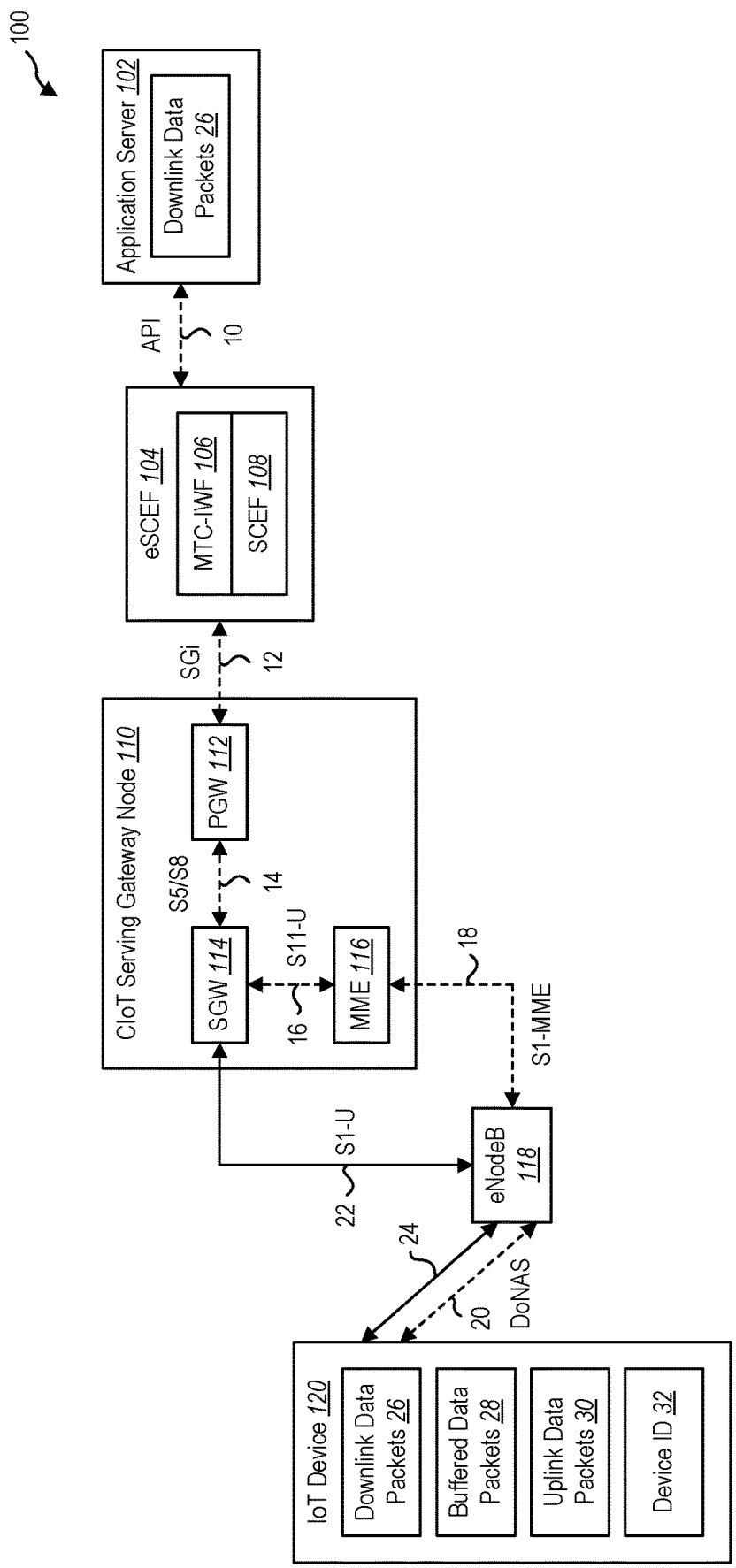
FIG. 1 illustrates an example system for CIoT in accordance with implementations of the present disclosure.

This disclosure generally relates to Cellular Internet of Things (CIoT) and using cellular technology to connect Internet of Things (IoT) devices to the internet. CIoT uses the standards defined in The $3^{rd}$ Generation Partnership Project (3GPP) Specifications, the contents of which are herein incorporated by reference in their entireties, and existing cellular infrastructure to provide secure communications to a plurality of IoT devices across various geographic areas. As such, CIoT may be scaled to communicate with thousands or millions of IoT devices.

CIoT may use the Narrow Band IoT (NB-IoT) architecture defined in the Release 13 3GPP Specifications, which connects devices simply and efficiently over Low Power Wide Area (LPWA) networks allowing 2-way communication with less-frequent, low power signals. As such, NB-IoT may be used for communicating with IoT devices that require low power, low bandwidth, and/or low usage to send and/or receive periodic or infrequent updates. IoT devices that communicate using NB-IoT may transmit small amounts of data and may go dormant for long periods of time between transmissions. Examples of IoT devices for use with NB-IoT may include, but are not limited to, remote environmental sensors, power meters, water meters, and/or tags on shipping parcels. The amount of data being transmitted by each IoT device using NB-IoT may be minimal, and thus, IoT devices using NB-IoT may require a minimal amount of bandwidth to transmit the data. One example use case may include a power meter that sends 100 bytes one time a day with a meter reading using NB-IoT. Another example use case may include small tags added to shipping parcels where the tags occasionally provide location updates for tracking and/or delivery information. As such, NB-IoT may use unused guard bands within a cellular carrier to send small data volumes.

IoT devices using NB-IoT may communicate using a data over non-access stratum (NAS) (DoNAS) channel. The data transmitted using the DoNAS channel may be Internet Protocol (IP) data or non-IP data. In addition, IoT devices using NB-IoT may use a S11-U interface, as defined in the 3GPP standards, for transmitting small amounts of data. IoT devices may use control channel optimization techniques, such as, S11-U tunneling, to deliver data packets to the IoT devices and/or send data packets from the IoT devices. The data throughput over the S11-U channel is low and works well for messages that are exchanged infrequently for IoT devices.

However, large data transfers may need to occur with IoT devices that require more bandwidth to transmit the data packets. For example, when a firmware upgrade or software update of the IoT device needs to occur, the data transfer may be changed to the order of kilobits or megabits. Moreover, IoT devices may need to download the firmware upgrade or software update more quickly than the data transfer rates supported by NB-IoT. The S11-U interface may not support the increase in data traffic. In addition, the mobility management entity (MME) may not handle the increase in data traffic, and thus, NB-IoT may not support the increased data traffic. The firmware upgrade or software update of the IoT devices may take a long time using NB-IoT and the firmware upgrade or software update may starve out the other IoT devices.

Currently, in order to support larger data transfers, applications may proactively work with the IoT devices to setup a data path to support the data transfer before the data transfers begin with the desired quality of service parameters. Both the application servers and the IoT devices must coordinate prior to the data transfer by synchronizing a time in the future when the data transfer may occur. Thus, current solutions are static solutions that require both parties to be aware that a file transfer needs to occur and requires that both parties are intelligent enough to communicate with each other to coordinate the transfer. Moreover, a large amount of resources may be consumed to coordinate the synchronization of the file transfers.

The devices and methods may dynamically switch from using data paths associated with the NB-IoT to data paths that support greater amounts of bandwidth in response to detecting an increase in data traffic. The devices and methods may switch from using an S11-U interface to using an S1-U interface, in response to dynamic changes occurring in the data traffic to the IoT devices. This disclosure includes several practical applications that provide benefits and/or solve problems associated with improving CIoT.

In an implementation, the MME may monitor the IoT traffic of each IoT device using the S11-U interface. Once the data transfer to an IoT device, or a plurality of IoT devices, crosses a threshold use of bytes, the MME may send a request to switch to using an S1-U interface instead of the S11-U interface for the data transfer by sending a trigger for the switchover. The MME may switch to using the S1-U interface for the data transfer, reducing the load on the MME. The protocol for switching may be seamless so that packet loss does not occur.

In another implementation, the Serving Gateway (SGW) may monitor the IoT traffic for a single IoT device using the S11-U interface. Once the IoT device crosses a threshold use of bytes, the SGW may send a request to switch to using a S1-U interface instead of the S11-U interface for the data transfer by sending a trigger for the switchover and switching to the S1-U interface. The protocol for switching may be seamless so that packet loss does not occur.

The methods and devices may optimize the data paths being used for IoT device communications in response to changes occurring in the data traffic. By dynamically creating data pathways for use with the IoT devices in response to current conditions, the methods and devices may provide faster data transfers or application downloads for IoT devices using CIoT. As such, the methods and devices may use CIoT to provide application downloads or software updates to a large number of IoT devices in various geographically locations at the same time. Moreover, the methods and devices may provide large data transmissions to IoT devices without starvation of other IoT devices for transmission or receiving data using CIoT.

Referring now to FIG. 1, a system 100 for use with CIoT for connecting one or more IoT devices 120 to the internet using cellular technology may include one or more application servers 102 in communication with one or more IoT devices 120. IoT devices 120 may include any device with a sensor that can transmit data using the internet. In an implementation, IoT devices 120 may be low usage or low power devices that use low bandwidth to send and/or receive periodic or infrequent communications. Examples of IoT devices 120 may include, but are not limited to, remote environmental sensors, power meters, water meters, and/or tags added to shipping parcels. As such, IoT devices 120 may use NB-IoT for communications between one or more application servers 102.

Application server 102 may receive uplink data packets 30 from one or more IoT devices 120 and/or may send downlink data packets 26 to one or more IoT devices 120 using system 100. For example, IoT devices 120 may send one or more readings or other data to application server 102. Another example may include application server 102 sending control commands or other IP data using NB-IoT. In some implementations, application server 102 may need to send larger data transmissions to IoT devices 120. For example, a security vulnerability or a software bug may need to be fixed on IoT devices 120, or a new feature is to be enabled on the IoT devices. As such, the software upgrade or application updates may need to be sent and/or downloaded by IoT devices 120 in a more rapid fashion than supported by NB-IoT.

An extended Service Capability Exposure Function (eS-CEF) 104 may expose one or more application programming interfaces (APIs) that may be invoked by application server 102. eSCEF 104 may include both a Machine Type Interworking Function (MTC-IWF) 106 and a Service Capability Exposure Function (SCEF) 108. eSCEF 104 may provide the functionality of both the MTC-IWF 106 and the SCEF 108. eSCEF 104 may make one or more API calls 10 to application server 102 with uplink data packets 30 transmitted from one or more IoT devices 120 to application server 102.

In addition, application server 102 may make one or more API calls 10 for the APIs exposed by eSCEF 104. Each API call 10 may include the downlink data packets 26 to transmit to IoT device(s) 120. In an implementation, the downlink data packets 26 may relate to a data transmission event, such as, but not limited to, control commands to IoT device 120, a software upgrade, and/or an application update. In addition, each API call 10 may identify one or more device IDs 32 of IoT device(s) 120 to receive the downlink data packets 26. As such, application server 102 may transmit downlink data packets 26 to a single IoT device 120 with an API call 10 or application server 102 may transmit downlink data packets 26 to a plurality of IoT devices 120 with an API call 10. eSCEF 104 may receive the API call 10 and may initiate the data transfer to the identified IoT device(s) 120 by translating the API call 10 into cellular functions and protocols for transmitting the downlink data packets 26. As such, eSCEF 104 makes it possible for the application servers 102 to communicate with the various network nodes without knowledge of the communication protocols implemented in the network.

eSCEF 104 may use an S11-U interface 16 initially for communication between application server 102 and IoT devices 120 because the data throughput over the S11-U interface 16 is low and works well for messages that are exchanged infrequently for IoT devices 120. The S11-U interface 16, as defined in the 3GPP standards, is a user plane interface that carries small data packets sent and received by the IoT device over NAS (via S1-MME 18) and passed between the Serving Gateway (SGW) 114 and the MME 116, as defined in the 3GPP standards. The S11-U interface 16 may be configured to transmit Non-IP Data between SGW 114 and MME 116.

The S11-U interface 16 may be a default or an initial interface used when eSCEF 104 transmits downlink data packets 26 from application server(s) 102 to IoT device(s) 120 via the SGi interface 12. As such, eSCEF 104 may initially translate the received API call into the protocols for the S11-U interface.

eSCEF 104 may transmit the downlink data packets 26 via an SGI interface 12 to a CIoT Serving Gateway Node (CSGN) 110. CSGN 110 consolidates the SGW 114, the Packet Data Network Gateway PGW 112, and the MME 116, and the respective functionality of the SGW 114, the PGW 112, and the MME 116 into a single node. An S5/S8 interface 14 may connect the PGW 112 and the SGW 114 and the S11-U interface 16 may connect the SGW 114 and the MME 116. The CSGN 110 may transmit the downlink data packets 26 to the Evolved Node B (eNodeB) 118 via an S1-MME interface 18. The eNodeB 118 may transmit the downlink data packets 26 to the IoT device 120 using a data over NAS channel (DoNAS) 20. DoNAS allows for data to be sent over the control plane signaling directly between MME 116 and the IoT device 120. IoT device 120 may receive the downlink data packets 26 transmitted from application server 102 and may perform one or more actions in response to receiving the downlink data packets 26.

In an implementation, the application server 102 may communicate directly with the CSGN 110 via SGI interface 12. As such, the application server 102 may bypass the eSCEF 104 for communications relating to internet data and may communicate directly with CSGN 110.

SGW 114 may monitor the dataflow for the downlink data packets 26 and may dynamically decide whether the traffic requirements are higher than what the S11-U interface 16 may support. SGW 114 may trigger setting up of an S1-U interface 22 for transmitting the downlink data packets 26 in response to determining that the traffic requirements exceed the capabilities supported by the S11-U interface 16. The S1-U interface 22 is defined in the 3GPP standards and any device may support the use of the S1-U interface 22 to send and/or receive data. In addition, the S1-U 22 interface supports higher bandwidth for transmitting the downlink data packets 26 as compared to the bandwidth supported by the S11-U interface 16. SGW 114 may dynamically construct the S1-U interface 22 in response to the current data traffic conditions using the paging techniques described in the 3GPP standards.

Figure 2A:
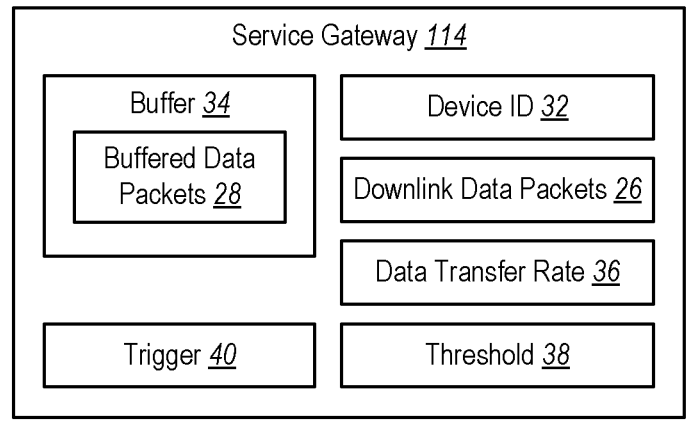
FIG. 2A illustrates a schematic diagram of a Serving Gateway (SGW) for use with implementations of the present disclosure.
Figure 3:
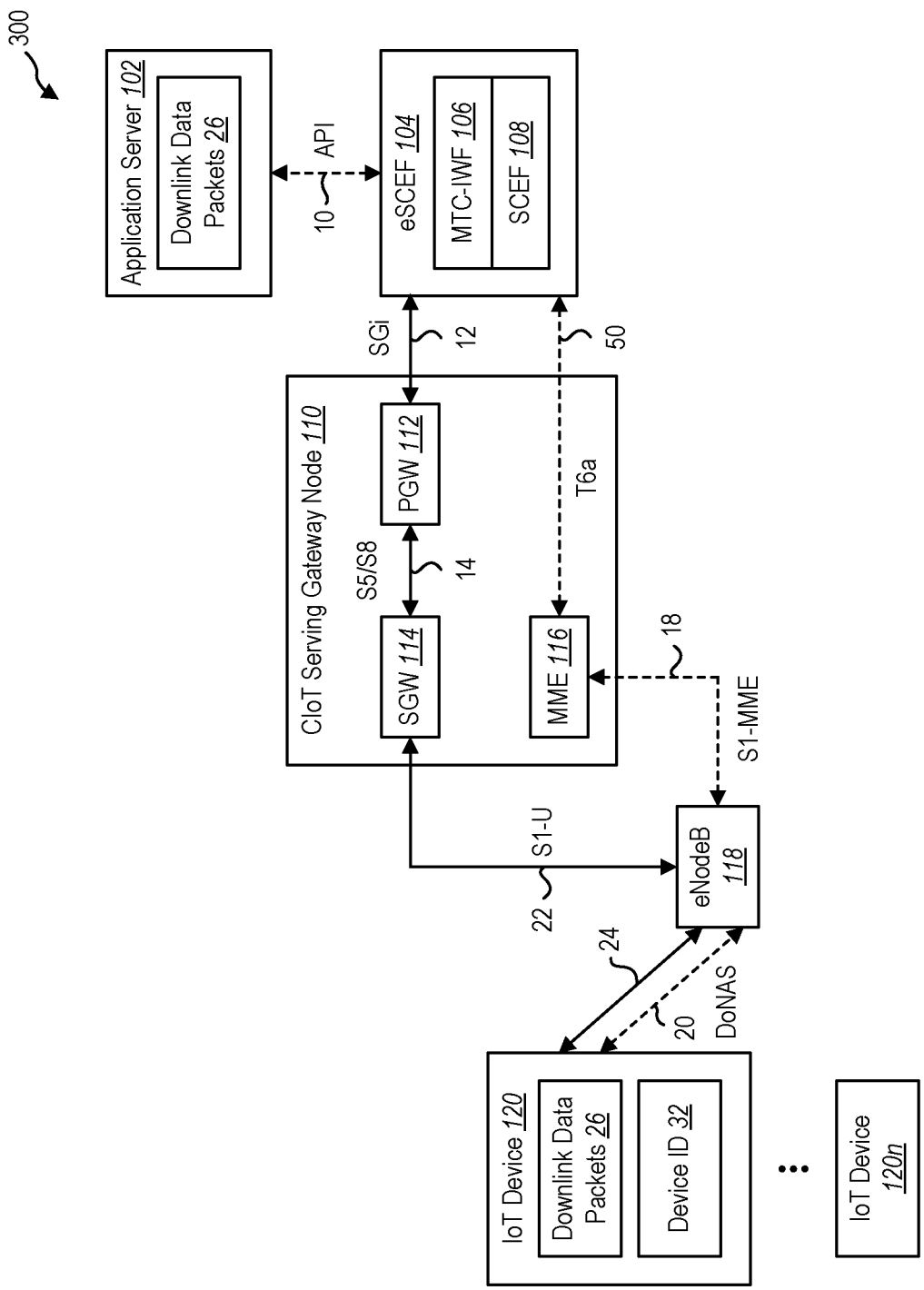
FIG. 3 illustrates an example system for CIoT in accordance with implementations of the present disclosure.

Referring now to FIG. 2A, illustrated is an example implementation of SGW 114 for use with systems 100 (FIG. 1) and 300 (FIG. 3). For each device ID 32, SGW 114 may monitor the data transfer rate 36 for the downlink data packets 26. The data transfer rate 36 may include a number of packets received for the downlink data packets 26 per second or a sustained duration of consecutive seconds with data sent to IoT device 120. SGW 114 may monitor the data transfer rate 36 over a period of time, and may compare the data transfer rate 36 to a threshold 38. The threshold 38 may identify an amount of data per second supported by the S11-U interface. Data transfer rates 36 exceeding the threshold 38 may result in a backup of data. When the data transfer rate 36 exceeds the threshold 38, SGW 114 may send a trigger 40 to initiate the establishment of another interface to support the increased data traffic. For example, the trigger 40 may initiate the establishment of the S1-U interface 22 (FIG. 1).

An example use case may include SGW 114 identifying that the data transfer rate 36 over a period of 30 seconds is 10 bytes per seconds. Thus, SGW 114 may receive thirty 10 byte packets within 30 seconds. The threshold 38 may be 100 bytes per 30 seconds. SGW 114 may determine that the 300 bytes received in the thirty 10 byte packets exceeds the threshold 38 of 100 bytes and may send the trigger 40 to start setting up the S1-U interface 22.

SGW 114 may include a buffer 34 and SGW 114 may start buffering the downlink data packets 26 in response to sending the trigger 40. SGW 114 may switch to using the S1-U interface 22 instead of the S11-U interface 16 in response to a completion of the S1-U interface 22 setup and may transmit the buffered data packets 28 using the S1-U interface 22.

Referring back to FIG. 1, SGW 114 may transmit the buffered data packets 28 to the eNodeB 118 using the S1-U interface 22. eNodeB 118 may transmit the buffered data packets 28 to the IoT device 120 using data channel 24. SGW 114 may continue to receive downlink data packets 26 from application server 102 until the data transmission event is complete. SGW 114 may transmit the received downlink data packets 26 using the S1-U interface 22 in response to the S1-U interface 22 being established until the data transmission event (e.g., the application download or software update) is complete.

IoT device 120 may perform one or more actions in response to receiving the downlink data packets 26. For example, IoT device 120 may perform a software upgrade and/or install new information in response to receiving the downlink data packets 26.

In an implementation, MME 116 may monitor the dataflow for the downlink data packets 26 and may dynamically decide that the traffic requirements are higher than what the MME 116 may be able to process. Thus, MME 116 may trigger setting up of an S1-U interface 22 for transmitting the downlink data packets 26 instead of SGW 114.

Figure 2B:
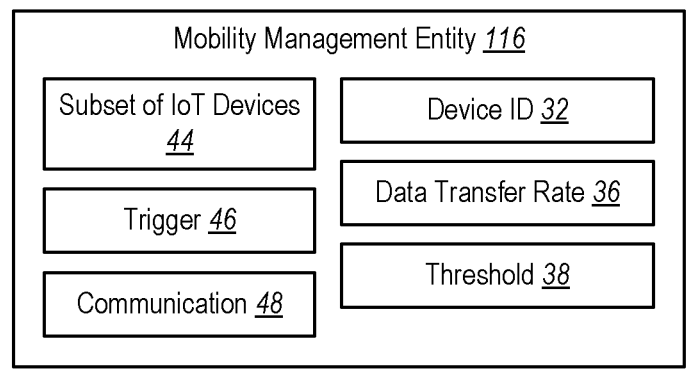
FIG. 2B illustrates a schematic diagram of a Mobility Management Entity (MME) for use with implementations of the present disclosure.

Referring now to FIG. 2B, illustrated is an example implementation of MME 116 for use with systems 100 (FIG. 1) and 300 (FIG. 3). MME 116 may monitor the data transfer rate 36 for the downlink data packets 26 received via the S11-U interface 16 (FIG. 1). The data transfer rate 36 may include a number of packets received for the downlink data packets 26 per second or a sustained duration of consecutive seconds with data sent to IoT device 120. The data transfer rate 36 may be for a single IoT device 120. In addition, the data transfer rate 36 may be the overload across a plurality of IoT devices 120. Thus, the data transfer rate 36 may include the aggregate of the number of packets received for each IoT device of the plurality of IoT devices 120 per second.

MME 116 may monitor the data transfer rate 36 over a period of time and may compare the data transfer rate 36 to a threshold 38. The threshold 38 may identify an amount of data per second supported by MME 116. MME 116 may be unable to process data loads that exceed the threshold 38. MME 116 may not be efficient for transmitting large amount of data, resulting in a backup of data. As such, when the data transfer rate 36 exceeds the threshold 38, MME 116 may send a trigger 46 to SGW 114 (FIG. 2) to initiate the establishment of another interface to support the increased data traffic.

In an implementation, MME 116 may use other factors than the volume of the data traffic exceeding the threshold 38 when determining whether to switch to using the S1-U interface 22. Other factors may include, but are not limited to, historical usage of the plurality of IoT devices, projected usage of the plurality of IoT devices, and/or device capabilities. In addition, MME 116 may use the other factors in combination with the volume of the data traffic exceeding the threshold 38 when determining whether to switch to using the S1-U interface 22.

SGW 114 may dynamically construct the S1-U interface 22 (FIG. 1) in response to receiving the trigger 40. SGW 114 may start buffering the downlink data packets 26 in response to sending the trigger 40. SGW 114 may switch to using the S1-U interface 22 instead of the S11-U interface 16 in response to a completion of the S1-U interface 22 setup and may transmit the buffered data packets 28 using the S1-U interface 22.

Referring back to FIG. 1, SGW 114 may transmit the received downlink data packets 26 using the S1-U interface 22 in response to the S1-U interface 22 being established until the data transmission event is complete. IoT device 120 may perform one or more actions in response to receiving the downlink data packets 26. For example, IoT device 120 may perform a software upgrade and/or install new information in response to receiving the downlink data packets 26.

SGW 114 may deconstruct, or otherwise deactivate, the S1-U interface 22 in response to the completion of the data transmission event. As such, only one of the S1-U interface 22 or the S11-U interface 16 may be active at a time. SGW 114 may resume sending the downlink data packets 26 using the S11-U interface 16 in response to the S1-U interface 22 being deactivated.

System 100 may optimize the data paths being used for IoT devices 120 in response to changes occurring in the data traffic. Moreover, system 100 may provide faster application downloads or software updates for IoT devices 120 using CIoT without starvation of other IoT devices 120 for transmission or receiving data from one or more application servers 102.

Application Server 102, eSCEF 104, CSGN 110, and/or IoT device 120 may include features and functionality described below in connection with FIG. 6. In addition, the components of eSCEF 104 and/or CSGN 110 may include hardware, software, or both. For example, the components of eSCEF 104 and/or CSGN 110 may include one or more instructions stored on a computer-readable storage medium and executable by processors of one or more computing devices. When executed by the one or more processors, the computer-executable instructions of one or more computing devices (e.g., eSCEF 104 and/or CSGN 110) can perform one or more methods described herein. Alternatively, the components of eSCEF 104 and/or CSGN 110 may include hardware, such as a special purpose processing device to perform a certain function or group of functions. Additionally, or alternatively, the components of eSCEF 104 and/or CSGN 110 may include a combination of computer-executable instructions and hardware.

Referring now to FIG. 3, a system 300 for use with CIoT for connecting one or more IoT devices 120 to the internet using cellular technology. System 300 may have the same components discussed in FIGS. 1, 2A, and 2B. In system 300, MME 116 may communicate directly with eSCEF 104 via a T6a interface 50, as defined in the 3GPP standards. As such, eSCEF 104 may transmit the downlink data packets 26 received from application server 102 directly to MME 116 using the T6a interface 50. The T6a interface 50 may support the transmission of non-IP data. In addition, the T6a interface 50 may be a low bandwidth communication channel. MME 116 may transmit the downlink data packets 26 to eNodeB 118 using an S1-MME interface 18, as defined in the 3GPP standards. eNodeB 118 may transmit the downlink data packets 26 to the IoT device 120 using a DoNAS 20 channel. IoT device 120 may receive the downlink data packets 26 transmitted from application server 102 and may perform one or more actions in response to receiving the downlink data packets 26. Thus, system 300 may use NB-IoT for communications between one or more application servers 102 and/or one or more IoT devices 120.

MME 116 may monitor the data transfer rate 36 for the downlink data packets 26 received via the T6a interface 50. The data transfer rate 36 may include a number of packets received for the downlink data packets 26 per second. The data transfer rate 36 may be for a single IoT device 120. In addition, the data transfer rate 36 may include the aggregate of the number of packets received for each IoT device of the plurality of IoT devices per second.

MME 116 may monitor the data transfer rate 36 over a period of time and may compare the data transfer rate 36 to a threshold 38. The threshold 38 may identify an amount of data per second MME 116 may support. MME 116 may be unable to process data loads that exceed the threshold 38, resulting in a backup of data. The threshold 38 may be per IoT device 120 (e.g., the amount of data MME 116 may support for a single IoT device 120) or the threshold 38 may be for the overload across a plurality of IoT devices (e.g., the amount of data MME 116 may support for the plurality of IoT devices).

When the data transfer rate 36 exceeds the threshold 38, MME 116 may send a communication 48 to the eSCEF 104 to initiate the establishment of another interface to support the increased data traffic. eSCEF 104 may communicate with SGW 114 to start constructing the S1-U interface 22 in response to receiving the communication 48 from MME 116. SGW 114 may dynamically construct the S1-U interface 22 using the paging techniques described in the 3GPP standards. eSCEF 104 may switch the transmission of the downlink data packets 26 from using the T6a interface 50 to using the S1-U interface 22 in response to the S1-U interface being established.

An example use case may include application server 102 transmitting a 100 byte file at 10 bytes per second to ten thousand IoT devices 120 at the same time. The transmission rate of 10 bytes per second may be within a threshold 38 of what data MME 116 may handle, however, the aggregation of ten thousand devices receiving the 10 bytes per second at the same time may exceed the threshold 38 of what data MME 116 may handle. As such, MME 116 may send a communication 48 to eSCEF 104 to offload the data to the S1-U interface 22.

In an implementation, MME 116 may identify a subset of IoT devices 44 to move to the S1-U interface 22. Instead of transferring all the data traffic for the plurality of IoT devices, only a portion of the data traffic may be moved to the S1-U interface 22. The communication 48 to the eSCEF 104 may identify the subset of IoT devices to move to the S1-U interface. Thus, a portion of the data traffic for the plurality of IoT devices may continue on the T6a interface 50, while a portion of the data traffic associated with the subset of IoT devices 44 may be transmitted using the S1-U interface 22.

In an implementation, MME 116 may use other factors than the volume of the data traffic exceeding the threshold 38 when determining whether to switch to using the S1-U interface 22. Other factors may include, but are not limited to, historical usage of the plurality of IoT devices, projected usage of the plurality of IoT devices, and/or device capabilities. In addition, MME 116 may use the other factors in combination with the volume of the data traffic exceeding the threshold 38 when determining whether to switch to using the S1-U interface 22.

SGW 114 may transmit the downlink data packets 26 using the S1-U interface 22 to the eNodeB 118. eNodeB 118 may transmit the downlink data packets 26 to the IoT device 120 using data channel 24. In addition, if MME 116 decided to move a subset of IoT devices 44 to the S1-U interface 22, SGW 114 may transmit a portion of the downlink data packets 26 for the subset of IoT devices 44 using the S1-U interface 22, while MME 116 continues to transmit the remaining portion the downlink data packets 26 using the DoNAS channel 20.

The plurality of IoT devices 120 may receive the downlink data packets 26 transmitted from application server 102, and the plurality of IoT devices 120 may perform one or more actions in response to receiving the downlink data packets 26. For example, the plurality of IoT devices 120 may perform a software upgrade and/or install new information in response to receiving the downlink data packets 26.

SGW 114 may deconstruct, or otherwise deactivate, the S1-U interface 22 in response to the completion of the data transmission event (e.g., the application update or software update). MME 116 may resume receiving all the downlink data packets 26 using the T6a interface 50 and transmitting the downlink data packets 26 using the S1-MME interface 18 in response to the S1-U interface 22 being deactivated.

System 300 may dynamically create data pathways for use with the plurality of IoT devices 120 in response to current conditions, and thus, system 300 may be used to reduce the load on the MME.

Figure 4:
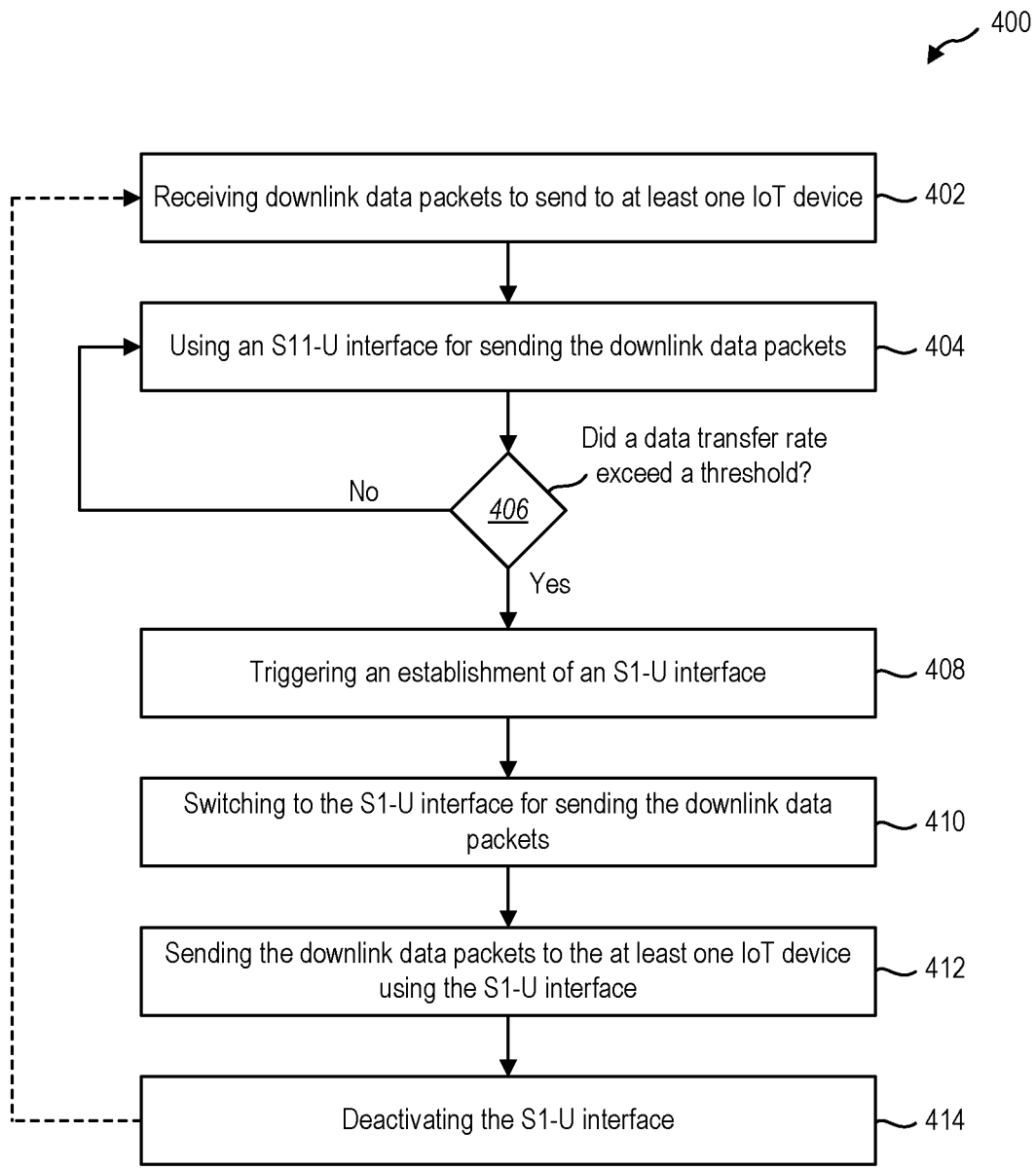
FIG. 4 illustrates an example method for dynamically switching between an S11-U interface and an S1-U interface in accordance with an implementation of the present disclosure.

Referring now to FIG. 4, an example method 400 may be used by SGW 114 (FIG. 1) or MME 116 (FIG. 1) for dynamically switching between an S11-U interface 16 (FIG. 1) and an S1-U interface 22 (FIG. 1). The actions of method 400 may be discussed below with reference to the architectures of FIGS. 1, 2A, and 2B.

At 402, method 400 may include receiving downlink data packets to send to at least one IoT device. A CSGN 110 may receive downlink data packets 26 sent from one or more application servers 102 to one or more IoT devices 120 using NB-IoT. IoT devices 120 may include any device with a sensor that can transmit data using the internet. In an implementation, IoT devices 120 may be low bandwidth or low power devices that send and/or receive periodic or infrequent communications. IoT devices 120 may use NB-IoT for communications between one or more application servers 102. CSGN 110 consolidates the SGW 114, the Packet Data Network Gateway PGW 112, and the MME 116, and the respective functionality of the SGW 114, the PGW 112, and the MME 116 into a single node.

CSGN 110 may receive the downlink data packets 26 from eSCEF 104. Application server 102 may make one or more API calls 10 for the APIs exposed by eSCEF 104. Each API call 10 may include the downlink data packets 26 to transmit to IoT device(s) 120. Each API call 10 may identify one or more device IDs 32 of IoT device(s) 120 to receive the downlink data packets 26. As such, application server 102 may transmit downlink data packets 26 to a single IoT device 120 with an API call 10 or application server 102 may transmit downlink data packets 26 to a plurality of IoT devices 120 with an API call 10. In an implementation, the downlink data packets 26 may relate to a data transmission event, such as, but not limited to, control commands to IoT device 120, a software upgrade, a new feature to enable, and/or an application update.

At 404, method 400 may include using an S11-U interface for sending the downlink data packets. The CSGN 110 may transmit the downlink data packets 26 using the S11-U interface to the Evolved Node B (eNodeB) 118 via an S1-MME interface 18, as defined in the 3GPP standards. The eNodeB 118 may transmit the downlink data packets 26 to the IoT device 120 using a data over NAS channel (DoNAS) 20.

The S11-U interface 16 may be a default or an initial interface used when eSCEF 104 transmits downlink data packets 26 from application server(s) 102 to IoT device(s) 120 via the SGi interface 12. eSCEF 104 may use an S11-U interface 16 initially for communication between application server 102 and IoT devices 120 because the data throughput over the S11-U interface 16 is low and works well for messages that are exchanged infrequently for IoT devices 120. The S11-U interface 16 is a user plane interface that carries small data packets sent and received by the IoT device 120 over NAS (via S1-MME 18) and passed between the Serving Gateway (SGW) 114 and the MME 116, as defined in the 3GPP standards. The S11-U interface 16 may be configured to transmit Non-IP Data between SGW 114 and MME 116. As such, eSCEF 104 may initially translate the received API call 10 into the protocols for the S11-U interface.

At 406, method 400 may include determining whether a data transfer rate exceeds a threshold. SGW 114 may monitor the data transfer rate 36 for the downlink data packets 26 and may dynamically decide whether the traffic requirements are higher than what the S11-U interface 16 may support. For example, the data transfer rate 36 may include a number of packets received for the downlink data packets 26 per second. SGW 114 may monitor the data transfer rate 36 over a period of time, and may compare the data transfer rate 36 to a threshold 38. The threshold 38 may identify a limit on the number of bytes received over a period of time. Data transfer rates 36 exceeding the threshold 38 may result in a backup of data.

In an implementation, MME 116 may monitor the dataflow for the downlink data packets 26 and may dynamically decide that the traffic requirements are higher than what the MME 116 may be able to process. For example, MME 116 may monitor the data transfer rate 36 for the downlink data packets 26 received via the S11-U interface 16 over a period of time. The data transfer rate 36 may include a number of packets received for the downlink data packets 26 per second. The data transfer rate 36 may be for a single IoT device 120. In addition, the data transfer rate 36 may be the overload across a plurality of IoT devices 120. Thus, the data transfer rate 36 may include the aggregate of the number of packets received for each IoT device of the plurality of IoT devices 120 per second.

MME 116 may compare the data transfer rate 36 to a threshold 38. The threshold 38 may identify a limit on the number of bytes received over a period of time supported by MME 116. MME 116 may be unable to process data loads that exceed the threshold 38, resulting in a backup of data. When the data transfer rate 36 exceeds the threshold 38, MME 116 may send a trigger 46 to SGW 114 to initiate the establishment of another interface to support the increased data traffic.

In an implementation, MME 116 may use other factors than the volume of the data traffic exceeding the threshold 38 when determining whether to switch to using the S1-U interface 22. Other factors may include, but are not limited to, historical usage of the plurality of IoT devices, projected usage of the plurality of IoT devices, and/or device capabilities. In addition, MME 116 may use the other factors in combination with the volume of the data traffic exceeding the threshold 38 when determining whether to switch to using the S1-U interface 22.

At 408, method 400 may include triggering an establishment of an S1-U interface. When the data transfer rate 36 exceeds the threshold 38, SGW 114 may send a trigger 40 to initiate the establishment of another interface to support the increased data traffic. SGW 114 may trigger setting up of an S1-U interface 22 for transmitting the downlink data packets 26 in response to determining that the traffic requirements exceed the capabilities supported by the S11-U interface 16.

SGW 114 may dynamically construct the S1-U interface 22 in response to the current data traffic conditions using the paging techniques described in the 3GPP standards. As such, signaling between SGW 114 and eNodB 118, as described in the 3GPP standards, establishes the S1-U interface 22. The S1-U interface 22 has higher bandwidth for transmitting the downlink data packets 26 relative to the bandwidth of the S11-U interface 16. In addition, SGW 114 may include a buffer 34 and SGW 114 may start buffering the downlink data packets 26 until a completion of the S1-U interface setup.

At 410, method 400 may include switching to the S1-U interface for sending the downlink data packets. SGW 114 may switch to using the S1-U interface 22 instead of the S11-U interface 16 in response to a completion of the S1-U interface setup.

At 412, method 400 may include sending the downlink data packets to the at least one IoT device using the S1-U interface. SGW 114 may transmit the buffered data packets 28 and any additional downlink data packets 26 received for a data transmission event using the S1-U interface 22. SGW 114 may transmit the buffered data packets 28 and the downlink data packets 26 to the eNodeB 118 using the S1-U interface 22. eNodeB 118 may transmit the buffered data packets 28 to the IoT device 120 using data channel 24. SGW 114 may continue to receive downlink data packets 26 from application server 102 until the data transmission event is complete.

At 414, method 400 may include deactivating the S1-U interface. SGW 114 may deconstruct, or otherwise deactivate, the S1-U interface 22 in response to the completion of the data transmission event. As such, only one of the S1-U interface 22 or the S11-U interface 16 may be active at a time.

Method 400 may repeat and SGW 114 may resume the using the S11-U interface for sending the downlink data packets 26 in response to the S1-U interface 22 being deactivated. Thus, any new downlink data packets 26 received from application server 102 may be sent using the S11-U interface initially.

By dynamically creating communication interfaces for use with the IoT devices in response to current data transfer conditions, method 400 may optimize the communication interfaces being used for IoT device communications in response to changes occurring in the data traffic.

Figure 5:
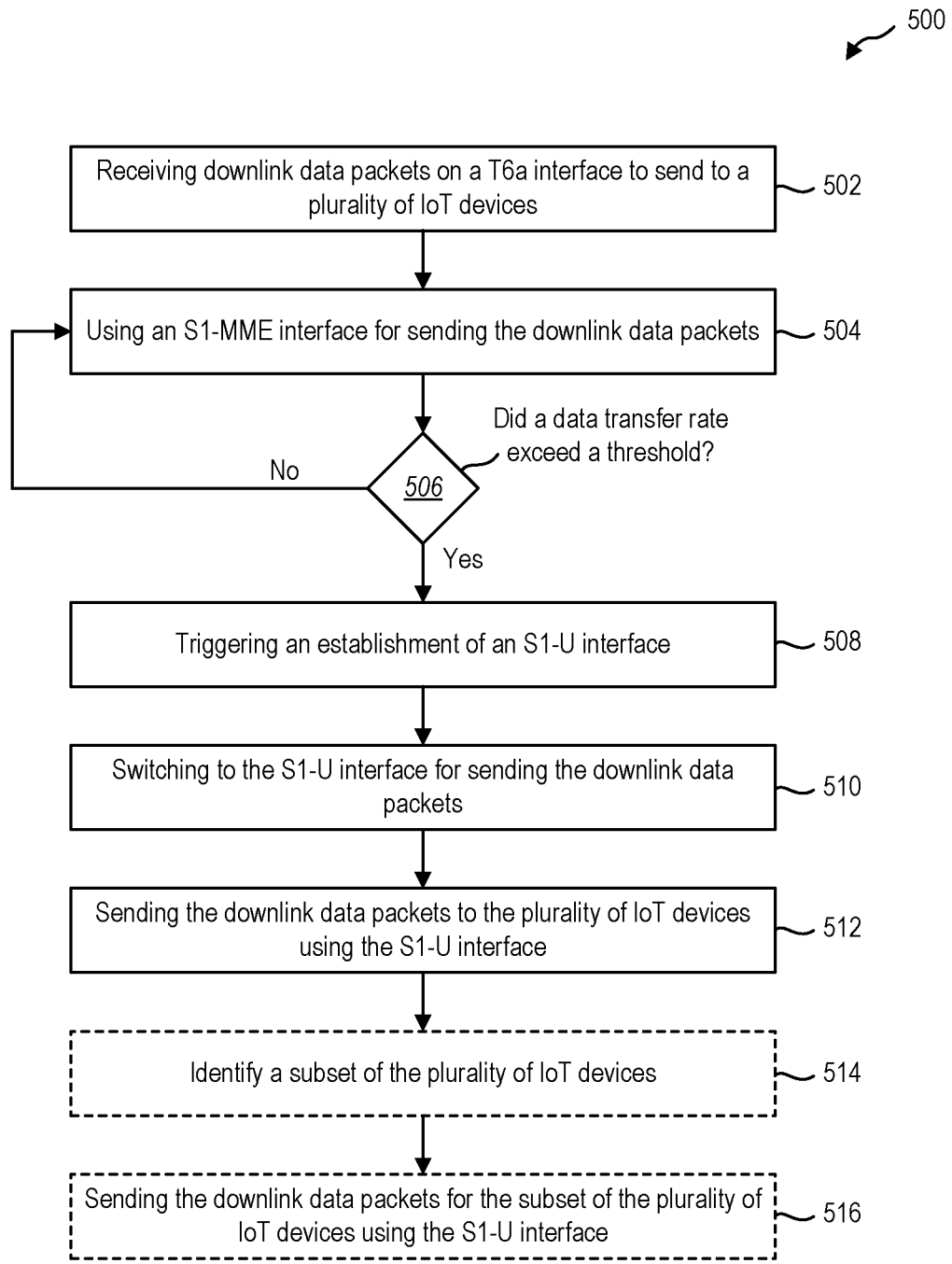
FIG. 5 illustrates an example method for dynamically switching between an T6a interface and an S1-U interface in accordance with an implementation of the present disclosure.

Referring now to FIG. 5, an example method 500 may be used by MME 116 (FIG. 1), SGW 114 (FIG. 1), and/or eSCEF 104 (FIG. 1) for dynamically switching between an T6a interface 50 (FIG. 1) and an S1-U interface 22 (FIG. 1). The actions of method 500 may be discussed below with reference to the architectures of FIGS. 3, 2A, and 2B.

At 502, method 500 may include receiving downlink data packets on a T6a interface to send to a plurality of IoT devices. Application server 102 may make one or more API calls 10 for the APIs exposed by eSCEF 104. Each API call 10 may include the downlink data packets 26 to transmit to the plurality of IoT devices 120. In addition, each API call 10 may identify the device IDs 32 of the plurality of IoT device 120 to receive the downlink data packets 26. IoT devices 120 may include any device with a sensor that can transmit data using the internet. In an implementation, IoT devices 120 may be low usage or low power devices that send and/or receive periodic or infrequent communications. IoT devices 120 may use NB-IoT for communications between one or more application servers 102. The downlink data packets 26 may relate to a data transmission event, such as, but not limited to, control commands to IoT device 120, a software upgrade, and/or an application update.

MME 116 may communicate directly with eSCEF 104 via a T6a interface 50. As such, eSCEF 104 may transmit the downlink data packets 26 received from application server 102 directly to MME 116 using the T6a interface 50. The T6a interface 50 may support the transmission of non-IP data. In addition, the T6a interface 50 may be a low bandwidth communication channel.

At 504, method 500 may include using an S1-MME interface for sending the downlink data packets. MME 116 may transmit the downlink data packets 26 to eNodeB 118 using an S1-MME interface 18. eNodeB 118 may transmit the downlink data packets 26 to the IoT device 120 using a DoNAS 20 channel. IoT device 120 may receive the downlink data packets 26 transmitted from application server 102 and may perform one or more actions in response to receiving the downlink data packets 26.

At 506, method 500 may include determining whether a data transfer rate exceeded a threshold. MME 116 may monitor the data transfer rate 36 for the downlink data packets 26 received via the T6a interface 50 over a period of time. The data transfer rate 36 may include a number of packets received for the downlink data packets 26 per second. The data transfer rate 36 may be for a single IoT device 120. In addition, the data transfer rate 36 may include the aggregate of the number of packets received for each IoT device of the plurality of IoT devices per second.

MME 116 may compare the data transfer rate 36 to a threshold 38. The threshold 38 may a limit on an amount of data per second MME 116 may support. MME 116 may be unable to process data loads that exceed the threshold 38, resulting in a backup of data. The threshold 38 may be per IoT device 120 (e.g., the amount of data MME 116 may support for a single IoT device 120) or the threshold 38 may be for the overload across a plurality of IoT devices (e.g., the amount of data MME 116 may support for the plurality of IoT devices).

At 508, method 500 may include triggering an establishment of an S1-U interface. When the data transfer rate 36 exceeds the threshold 38, MME 116 may send a communication 48 to the eSCEF 104 to initiate the establishment of another interface to support the increased data traffic. eSCEF 104 may communicate with SGW 114 to start constructing the S1-U interface 22 in response to receiving the communication 48 from MME 116. SGW 114 may construct the S1-U interface 22 using the paging techniques described in the 3GPP standards. As such, signaling between SGW 114 and eNodB 118, as described in the 3GPP standards, establishes the S1-U interface 22. The S1-U interface 22 has higher bandwidth for transmitting the downlink data packets 26 relative to the bandwidth of the S1-MME interface 18.

In an implementation, MME 116 may use other factors than the volume of the data traffic exceeding the threshold 38 when determining whether to switch to using the S1-U interface 22. Other factors may include, but are not limited to, historical usage of the plurality of IoT devices, projected usage of the plurality of IoT devices, and/or device capabilities. In addition, MME 116 may use the other factors in combination with the volume of the data traffic exceeding the threshold 38 when determining whether to switch to using the S1-U interface 22.

At 510, method 500 may include switching to the S1-U interface for sending the downlink data packets. eSCEF 104 may switch the transmission of the downlink data packets 26 from using the T6a interface 50 to using the S1-U interface 22 in response to the S1-U interface being established.

At 512, method 500 may include sending the downlink data packets to the plurality of IoT devices using the S1-U interface. SGW 114 may transmit the downlink data packets 26 using the S1-U interface 22 to the eNodeB 118. eNodeB 118 may transmit the downlink data packets 26 to the IoT device 120 using data channel 24.

The plurality of IoT devices 120 may receive the downlink data packets 26 transmitted from application server 102, and the plurality of IoT devices 120 may perform one or more actions in response to receiving the downlink data packets 26. For example, the plurality of IoT devices 120 may perform a software upgrade and/or install new information in response to receiving the downlink data packets 26.

At 514, method 500 may optionally include identifying a subset of the plurality of IoT devices. MME 116 may identify a subset of IoT devices 44 to move to the S1-U interface 22. Instead of transferring all the data traffic for the plurality of IoT devices 120, only a portion of the data traffic may be moved to the S1-U interface 22. The communication 48 from MME 116 to eSCEF 104 may identify the subset of IoT devices to move to the S1-U interface.

At 516, method 500 may optionally include sending the downlink data packets for the subset of the plurality of IoT devices using the S1-U interface. If MME 116 decided to move a subset of IoT devices 44 to the S1-U interface 22, eSCEF 104 may transmit a portion of the downlink data packets 26 for the subset of IoT devices 44 to SGW 114 to send using the S1-U interface 22, while transmitting the remaining portion of the downlink data packets to MME 116 via the T6a interface for sending using the DoNAS channel 20. Thus, a portion of the data traffic for the plurality of IoT devices 120 may continue on the T6a interface 50, while a portion of the data traffic associated with the subset of IoT devices 44 may be transmitted using the S1-U interface 22.

SGW 114 may deconstruct, or otherwise deactivate, the S1-U interface 22 in response to the completion of the data transmission event (e.g., the application update or software update). Method 500 may repeat and MME 116 may resume receiving any new downlink data packets 26 from the application server(s) 102 using the T6a interface 50 and may transmit the newly received downlink data packets 26 using the S1-MME interface 18.

Method 500 may dynamically create data pathways for use with the plurality of IoT devices 120 in response to current conditions and may be used to reduce the load on the MME 116.

Figure 6:
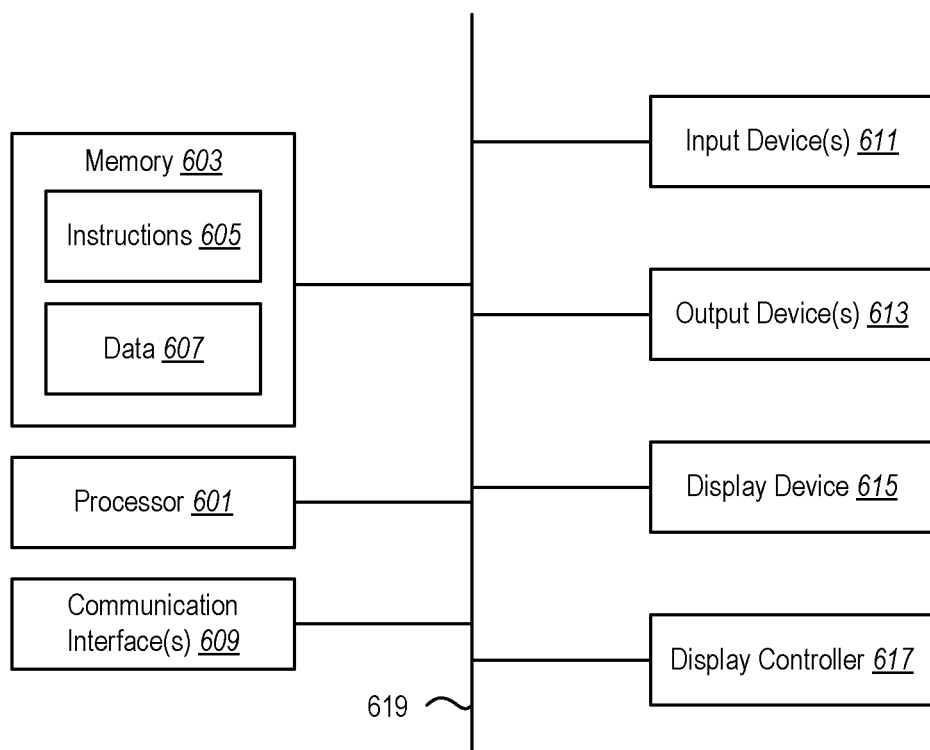
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving, from an application server, downlink data packets to send to at least one Internet of Things (IoT) device using a low bandwidth S11-U interface of a cellular narrow band IoT system;
   determining that a data transfer rate for the downlink data packets exceeds a threshold;
   triggering, by signaling between a Serving Gateway (SGW) and an Evolved Node B of the cellular narrow band IoT system, an establishment of a S1-U interface that has higher bandwidth for transmitting the downlink data packets than the low bandwidth of the S11-U interface;
   switching to the S1-U interface for sending the downlink data packets; and
   sending the downlink data packets to the at least one IoT device using the S1-U interface.

2. The method of claim 1, further comprising:
   buffering the downlink data packets while the S1-U interface is being established; and
   sending buffered data packets to the at least one IoT device using the S1-U interface in response to a completion of setting up the S1-U interface.

3. The method of claim 1, further comprising:
   deactivating the S1-U interface in response to a completion of a data transmission event associated with the downlink data packets; and
   resuming use of the S11-U interface for sending new downlink data packets received from the application server for the at least one IoT device.

4. The method of claim 1, wherein the data transfer rate is a number of bytes received per second or a sustained duration of consecutive seconds with data sent to the at least one IoT device.

5. The method of claim 4, wherein the threshold is a limit on the number of bytes received over a period of time.

6. The method of claim 1, further comprising:
   monitoring, by the SGW, the data transfer rate, and
   wherein the SGW triggers the establishment of the S1-U interface.

7. The method of claim 1, further comprising:
   monitoring, by a Mobility Management Entity (MME), the data transfer rate, and
   wherein the MME triggers the establishment of the S1-U interface.

8. The method of claim 1, wherein the at least one IoT device is a low power device that uses low bandwidth to send or receive infrequent communications.

9. A computer device, comprising:
   a memory to store data and instructions; and
   at least one processor operable to communicate with the memory, wherein the at least one processor is operable to:
   receive, from an application server, downlink data packets to send to at least one Internet of Things (IoT) device using a low bandwidth S11-U interface of a cellular narrow band IoT system;
   determine that a data transfer rate for the downlink data packets exceeds a threshold;
   trigger, by signaling between a Serving Gateway (SGW) and an Evolved Node B of the cellular narrow band IoT system, an establishment of an S1-U interface that has higher bandwidth for transmitting the downlink data packets than the low bandwidth of the S11-U interface;
switch to the S1-U interface for sending the downlink data packets; and
send the downlink data packets to the at least one IoT device using the S1-U interface.

10. The computer device of claim 9, wherein the processor is further operable to:
buffer the downlink data packets while the S1-U interface is being established; and
send buffered data packets to the at least one IoT device using the S1-U interface in response to a completion of setting up the S1-U interface.

11. The computer device of claim 9, wherein the processor is further operable to:
deactivate the S1-U interface in response to completion of a data transmission event associated with the downlink data packets; and
resume use of the S11-U interface for sending new downlink data packets received from the application server for the at least one IoT device.

12. The computer device of claim 9, wherein the data transfer rate is a number of bytes received per second or a sustained duration of consecutive seconds with data sent to the at least one IoT device.

13. The computer device of claim 12, wherein the threshold is a limit on the number of bytes received over a period of time.

14. The computer device of claim 9, wherein the computer device is the Serving Gateway (SGW).

15. The computer device of claim 9, wherein the computer device is a Mobility Management Entity (MME).

16. The computer device of claim 9, wherein the at least one IoT device is a low power device that uses low bandwidth to send or receive infrequent communications.

17. A method, comprising:
receiving, on a T6a interface, downlink data packets from an application server to send to a plurality of Internet of Things (IoT) devices using a low bandwidth S1-Mobility Management Entity (MME) interface of a cellular narrow band IoT system;
determining that a data transfer rate for the downlink data packets exceeds a threshold;
triggering, by signaling between a Serving Gateway (SGW) and an Evolved Node B of the cellular narrow band IoT system, an establishment of an S1-U interface that has higher bandwidth for transmitting the downlink data packets than the low bandwidth of the S1-MME interface;
switching to the S1-U interface for sending the downlink data packets; and
sending the downlink data packets to the plurality of IoT devices using the S1-U interface.

18. The method of claim 17, further comprising:
identifying a subset of the plurality of IoT devices;
sending a portion of the downlink data packets associated with the subset of the plurality of IoT devices using the S1-U interface; and
sending the remaining downlink data packets for the plurality of IoT devices using the S1-MME interface.

19. The method of claim 17, wherein the threshold is a limit on the data transfer rate for the plurality of IoT devices over a period of time or a sustained duration of consecutive seconds with data sent to the plurality of IoT device.

20. The method of claim 17, wherein the plurality of IoT devices are low power devices that use low bandwidth to send or receive infrequent communications.

* * * * *